(12) United States Patent
Drut (10) Patent No.: US 9,067,696 B2
(45) Date of Patent: Jun. 30, 2015

(54) FORMING SHOULDER AND DEVICE FOR PRODUCING TUBULAR BAGS

(76) Inventor: Henry Drut, Dresden (DE)

( * ) Notice: Subject to any disclaimer, the term of this patent is extended or adjusted under 35 U.S.C. 154(b) by 368 days.

(21) Appl. No.: 13/505,927

(22) PCT Filed: Sep. 3, 2010

(86) PCT No.: PCT/DE2010/001047
§ 371 (c)(1), (2), (4) Date: May 3, 2012

(87) PCT Pub. No.: WO2011/060749
PCT Pub. Date: May 26, 2011

(65) Prior Publication Data
US 2012/0245010 A1 Sep. 27, 2012

(30) Foreign Application Priority Data
Nov. 19, 2009 (DE) .......................... 10 2009 053 415

(51) Int. Cl.
| | | |
|---|---|---|
| B31B 35/26 | (2006.01) |
| B65B 9/22 | (2006.01) |
| B29C 65/08 | (2006.01) |
| B29C 65/18 | (2006.01) |
| B29C 65/00 | (2006.01) |
| B65B 51/26 | (2006.01) |

(52) U.S. Cl.
CPC . *B65B 9/22* (2013.01); *B29C 65/08* (2013.01); *B29C 65/18* (2013.01); *B29C 66/112* (2013.01); *B29C 66/1122* (2013.01); *B29C 66/133* (2013.01); *B29C 66/135* (2013.01); *B29C 66/4312* (2013.01); *B29C 66/4322* (2013.01); *B29C 66/49* (2013.01); *B29C 66/81413* (2013.01); *B29C 66/81423* (2013.01); *B29C 66/849* (2013.01); *B65B 51/26* (2013.01); *B65B 2220/08* (2013.01); *B65B 2220/10* (2013.01)

(58) Field of Classification Search
USPC ............ 493/243, 302, 248, 254; 53/451, 551, 53/456, 550
See application file for complete search history.

(56) References Cited

U.S. PATENT DOCUMENTS 2,969,627 A * 1/1961 Leasure ......................... 53/451
3,486,424 A * 12/1969 Tanner ......................... 493/468
(Continued)

FOREIGN PATENT DOCUMENTS

| DE | 102007049703 A1 | 4/2009 |
| EP | 1340679 A1 | 9/2003 |
| WO | 0200502 A1 | 1/2002 |

OTHER PUBLICATIONS

International Search Report for PCT/DE2010/001047 dated Apr. 5, 2011.

*Primary Examiner* — Sameh Tawfik
(74) *Attorney, Agent, or Firm* — Heslin Rothenberg Farley & Mesiti P.C.

(57) ABSTRACT

In a method for producing tubular bags, a forming shoulder for shaping a packaging material web into a tubular bag having a laterally offset longitudinal seam includes a shoulder part and a prism part connected to each other along a shaping edge. Half of the shaping edge facing the incoming packing material web lies in the first and second quadrants of the cross-section of the prism part and the seam is formed in the fourth quadrant. Curvature-free surface lines in the second and fourth quadrants originating from the shaping edge approach each other with increasing distance from the prism part, and the shaping edge angle measured between the surfaces of the shoulder part and the inner face of the prism part decreases from the second to the third quadrant and increases again from the third to the fourth quadrant.

9 Claims, 10 Drawing Sheets

(56) References Cited

U.S. PATENT DOCUMENTS

| | | | |
|---|---|---|---|
| 4,194,438 A * | 3/1980 | Schmachtel | 493/274 |
| 4,532,754 A | 8/1985 | Hokanson | |
| 5,685,132 A * | 11/1997 | Romijn et al. | 53/551 |
| 5,707,329 A * | 1/1998 | Pool et al. | 493/302 |
| 6,599,389 B1 * | 7/2003 | Uneda | 156/379.8 |
| 6,845,602 B2 * | 1/2005 | Drut | 53/551 |

* cited by examiner

FORMING SHOULDER AND DEVICE FOR PRODUCING TUBULAR BAGS

CROSS REFERENCE TO RELATED APPLICATIONS

This application is a national stage filing under section 371 of International Application No. PCT/DE2010/001047 filed on Sep. 3, 2010, and published in German on May 26, 2011 as WO 2011/060749 A1 and claims priority of German application No. 10 2009 053 415.6 filed on Nov. 19, 2009, the entire disclosure of these applications being hereby incorporated herein by reference.

BACKGROUND ART

The invention relates to methods and devices for producing a tubular bag, for instance a so-called stickpack bag with laterally offset longitudinal seam.

Figure 1:
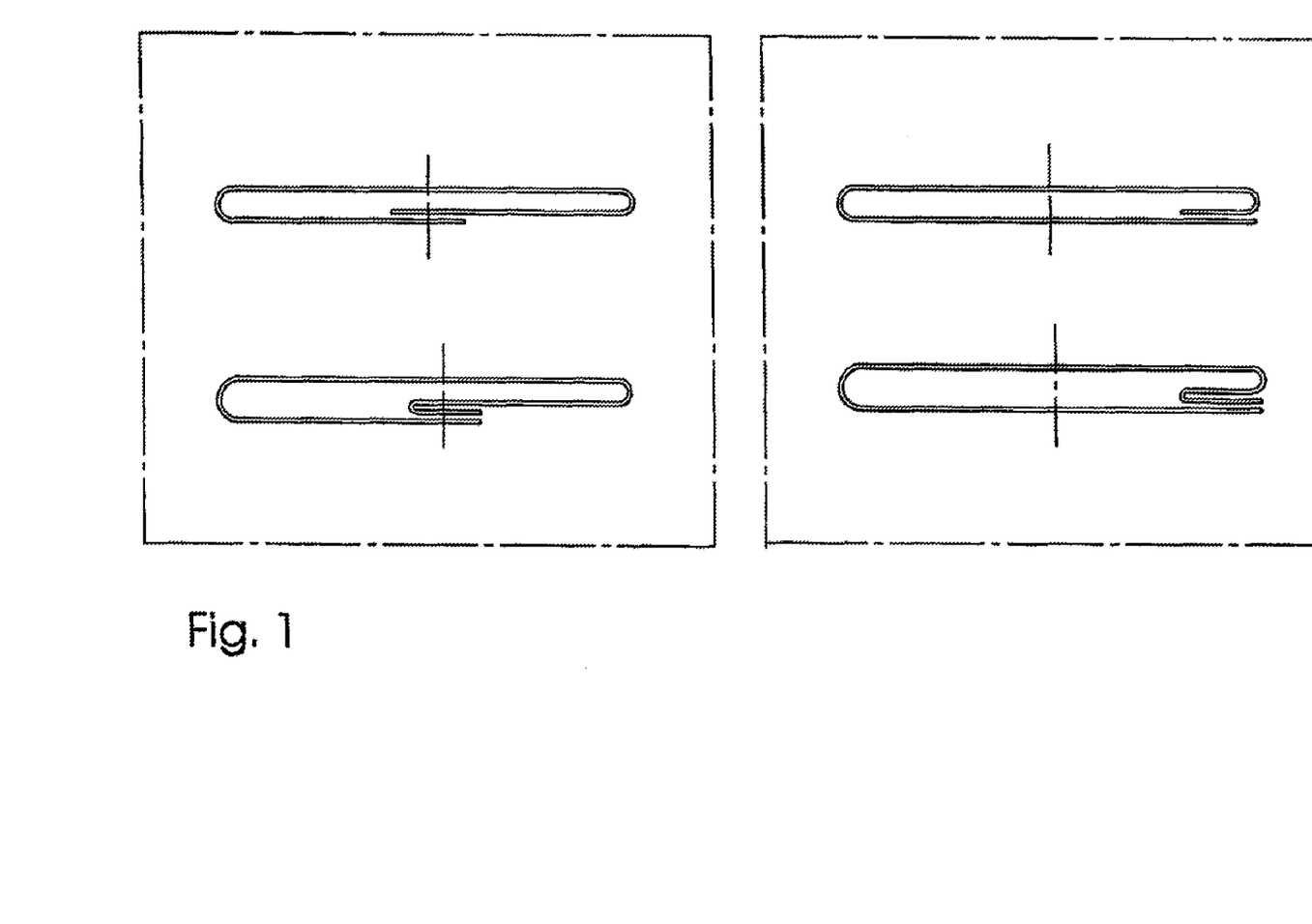
FIG. 1 shows the cross sections of traditional, symmetrical bag cross sections and asymmetrical bag cross sections in a comparison.

The term "laterally offset longitudinal seam" here means that the seam region, in the case of a tubular bag delimited by transverse seams, lies outside the middle, i.e. the longitudinal median plane of the bag does not intersect the region of overlap of the web margins which form the longitudinal seam, for instance a so-called fin seam or a lap seam. In FIG. 1, the cross sections of traditional, symmetrical bag cross sections, in which the seam lies in or close to the middle of one side of the bag, are compared to the asymmetrical bag cross sections discussed here in which the longitudinal seam is arranged laterally, respectively in the embodiment comprising a lap seam and a fin seam.

The production of a tubular bag with laterally offset longitudinal seam can be realized by shaping the tube cross section from a flat packaging material web, for instance a film or paper web, by means of a forming shoulder or other suitable means, and sealing the longitudinal seam by a longitudinal welding member for welding together the web edges, and then subsequently closing the individual bags obtained from the thus generated tube by means of a transverse welding device.

At present, stickpack tubular bags, i.e. tubular bag portion packs of 8 to 50 mm bag width, are produced with a longitudinal seam located in or close to the middle of one side of the flat-pressed bag. The seam width in stickpacks is relatively large in relation to the bag width. The seam side of the bag has therefore only limited use for advertising and information purposes. In standard format tubular bags (50 to 250 mm), it is very common for these reasons to place the longitudinal seam on the side.

That this feature has so far yet to become established in the stickpack field is due to the fact that the subsequent treatment of the asymmetrical tubes in traditional bag forming, filling and sealing machines can only be realized with great effort, i.e. a special machine for these formats would have to be developed.

Figure 2:
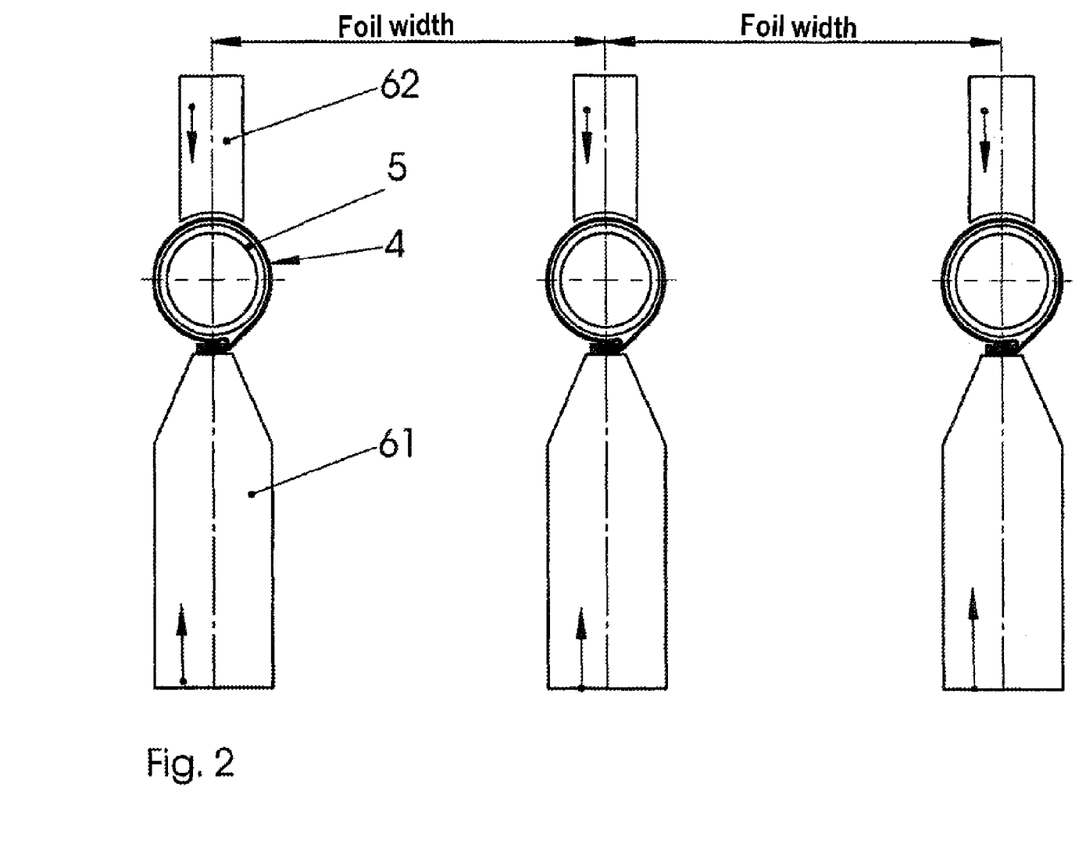
FIG. 2 shows a bag forming, filling and sealing machine, which operates on a multi-row basis, for welding together a symmetrical tube with straight advancement of the welding tool.

Unlike in bag forming, filling and sealing machines for standard formats, stickpack machines operate always on a multi-row basis, i.e. in the stickpack machine a plurality of stickpacks are shaped and filled next to one another. In tubular bags whose longitudinal seam is arranged in the middle of one side of the tube cross section, the longitudinal welding members, and, where necessary, counterstays, may be arranged such that they act transversely to the row-like arrangement, as is represented in FIG. 2.

Figure 3:
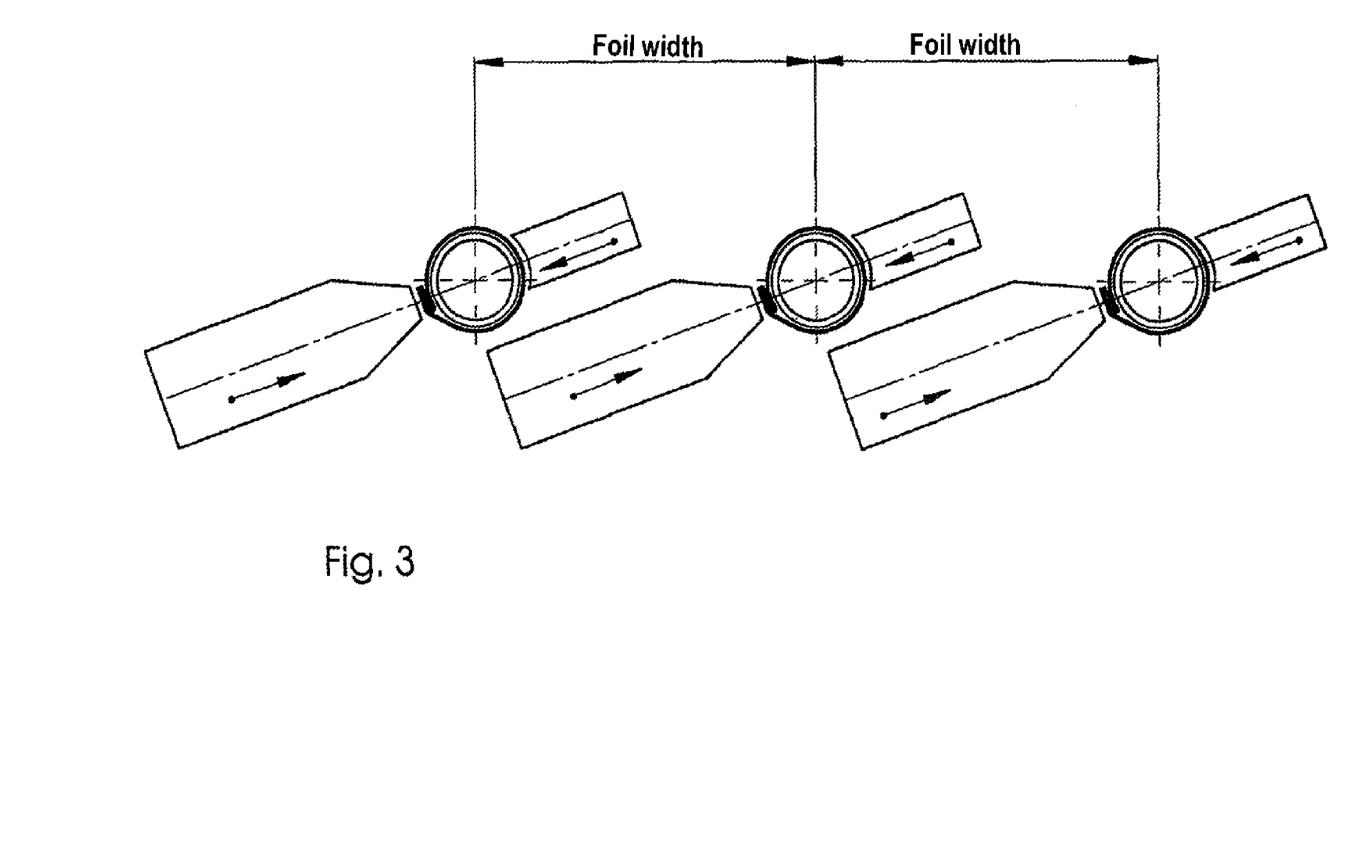
FIG. 3 shows a bag forming, filling and sealing machine, which operates on a multi-row basis, for welding together a symmetrical tube with obliquely angled advancement of the welding tool.

If the longitudinal seam is to be arranged laterally offset, however, then too little space for the lateral positioning of the longitudinal welding device remains between the forming shoulders. Contrary to the solution in the standard machine for welding together of a symmetrical tube, the advancement of the welding tool would need to be realized at an oblique angle, as is represented in FIG. 3. This would be very complex, however, which is why there has hitherto been no mechanical realization of this arrangement.

The described technical difficulties which have so far prevented stickpack bags with laterally situated longitudinal seam from being made available on the market have to be surmounted.

The procedural problem in developing a forming shoulder for stickpack bags with laterally situated longitudinal seam consists in the fact that the web (of film or paper), due to the summarily greater forming and friction forces on the long side, slides away laterally. The developed line length of the web which is diverted on the forming shoulder is, starting from the median line, of varying length. The working resistance in the forming of the web on the forming shoulder is substantially determined by friction and deformation forces. This is intended to be compensated by designing the forming shoulder geometry such that these forces are equalized and the web is prevented from sliding away on one side.

The web which has once been shaped by the forming shoulder in the longitudinal direction tends to stretch out again after having been released. With respect to the longitudinal welding, there are technological risks involved in the positioning and fixing of the tube shortly before being welded. This is intended to be secured by optimal design of the forming shoulder and longitudinal welding device, i.e. longitudinal welding member and, where necessary, counterstay, and, where necessary, of further fixing members. For the solution to the problem of the asymmetrical, i.e. laterally offset longitudinal welding, methods and devices offering a completely new approach to the design of the forming shoulder and of the longitudinal welding device are proposed.

Figure 5:
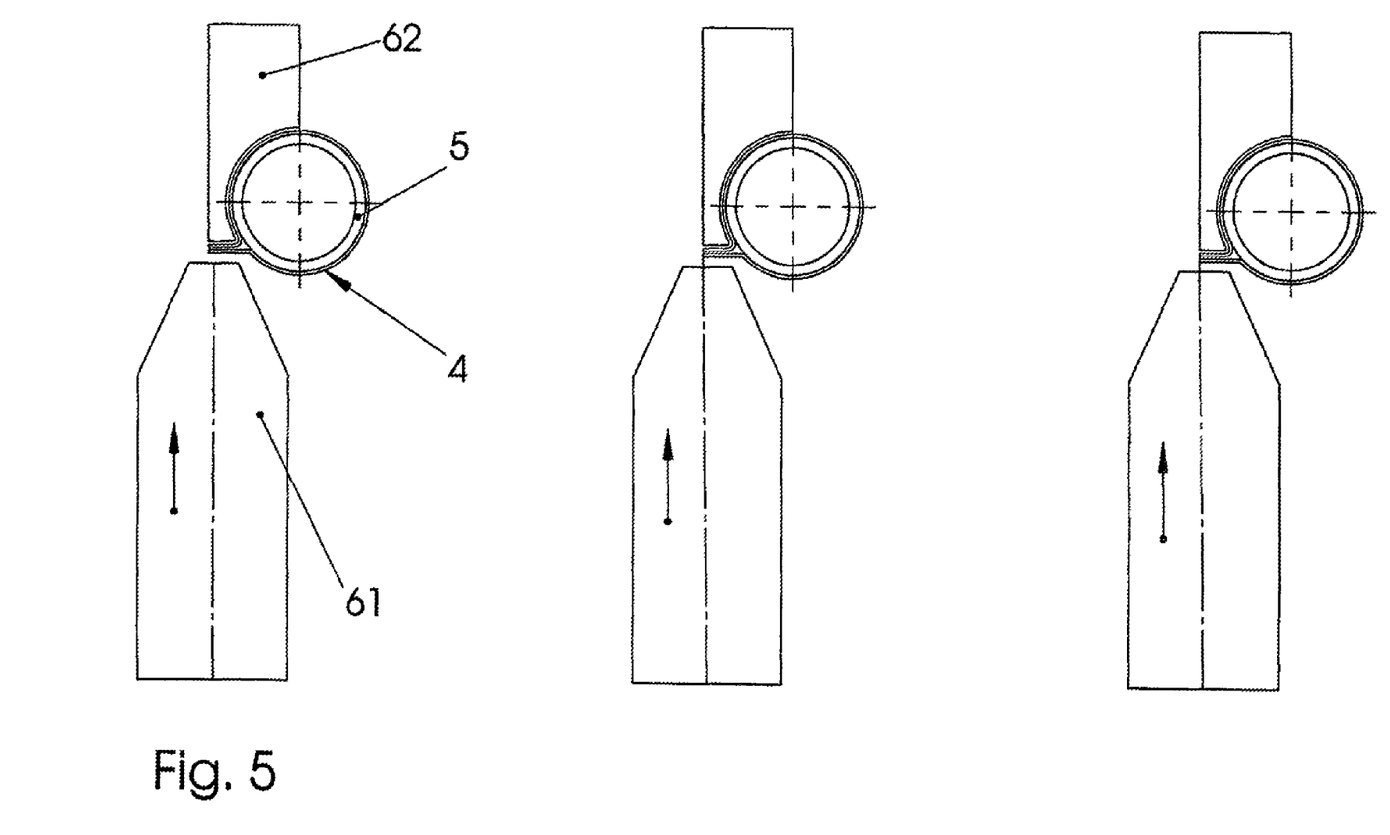
FIG. 5 shows a welding device having a longitudinal welding member and a counterstay extending past a tube-forming element of the forming shoulder.

The device can here comprise a longitudinal welding member and a counterstay for the longitudinal welding member, wherein the counterstay extends past a tube-forming element of the forming shoulder, for instance the prism part of the forming shoulder and/or the filling pipe projecting into a forming shoulder of this type, or partially embraces said tube-forming element, and thus supports the longitudinal seam against the action of the longitudinal welding member. Such an embodiment of the proposed device is represented in FIG. 5. Alternatively, longitudinal welding members and counterstays can be arranged on the same side of the tube-forming element. They can in this case be movably connected to one another. Moreover, in both embodiments, the counterstay can also be configured as a longitudinal welding member.

Furthermore, the device can comprise a transverse welding device for compressing the tube and forming a transverse weld seam.

The method for producing the tubular bag with laterally offset longitudinal seam can comprise the following steps:
1. Shaping of a tube having a longitudinal seam, oriented perpendicularly to the median plane of the bag, from a planar material, for instance a film web,
2. Fixing, i.e. sealing of the longitudinal seam by longitudinal welding with a welding member which is configured as described above and acts against a counterstay,
3. Compression of the tube and, where necessary, formation of a transverse weld seam by means of a transverse welding device.

Figure 4:
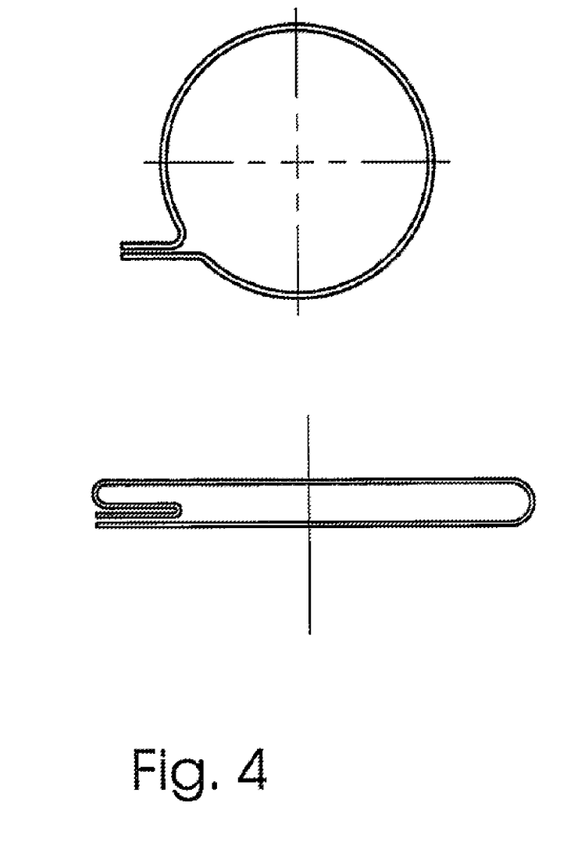
FIG. 4 shows the formation of an asymmetrical tube cross section and the effect of the subsequent compression by a transverse welding device.

The effect of the third method step of the above-described embodiment is represented in FIG. 4.

The proposed device for producing tubular bags with laterally situated longitudinal seam can be fitted onto traditional bag forming, filling and sealing machines retrofitted without additional effort, i.e. pre-existing machines can be easily upgraded.

By means of a forming shoulder, an asymmetrical film tube cross section is produced and is generated by compression, while maintaining the working direction of the longitudinal welding tools in standard machines.

The traditional problems with respect to the skewing of the longitudinal welding members and, where present, the counterstays, are circumvented here. The solution can be implemented on standard machines. All that is needed is to laterally offset the longitudinal welding members and, where necessary, install an appropriate counterstay.

In order to surmount the above-described problems in the production of stickpacks with laterally offset longitudinal seam, in particular where a plurality of forming, welding and filling devices are provided, a device for producing a tubular bag, and a forming shoulder, which can be a component part of the described device, are proposed below.

BRIEF SUMMARY OF INVENTION

In a device for producing a tubular bag, which device comprises a forming shoulder for forming a packaging material web into a tubular bag having a laterally offset longitudinal seam and in which the packaging material web enters in an inlet direction into the shoulder part of the forming shoulder and exits in an outlet direction from the tube-forming element of the forming shoulder, and the longitudinal seam is generated eccentrically in relation to the cross section of the tubular bag, and which device further comprises a longitudinal welding member having a contact surface, it is proposed that the longitudinal welding member is mounted such that it is movable parallel to the plane spanned by the inlet direction and the outlet direction.

If the longitudinal welding member applies a force to a tube-forming element (prism part or filling pipe) of the forming shoulder and the tube-forming element is dimensioned sufficiently rigidly, it is possible to dispense with a counterstay. On the other hand, a counterstay is required in those cases in which the longitudinal welding member does not act upon the tube-forming element or in which the longitudinal welding member acts upon the tube-forming element and this were to deform under the force action.

In one embodiment, a counterstay having a contact surface for supporting the pressing force generated by the longitudinal welding member can therefore also be provided, which counterstay is likewise mounted such that it is movable parallel to the plane spanned by the inlet direction and the outlet direction.

By virtue of this fixing of the motional direction of the longitudinal welding member and/or counterstay, the described drawbacks of known devices are surmounted. The longitudinal welding member and/or the counterstay can be heatable in order to generate the necessary temperature to produce a longitudinal seam in the packaging material web. Other embodiments are, however, expressly covered by the inventive concept, for instance embodiments in which the longitudinal welding member and/or the counterstay, where present, are ultrasonic transmitters, in order to produce the longitudinal seam in the packaging material web by means of ultrasonic welding.

It can further be provided that the counterstay is mounted on that side of the tube-forming element (prism part or filling pipe) of the forming shoulder which lies opposite the site of the longitudinal seam formation. Alternatively, the counterstay can be mounted on the same side of the tube-forming element of the forming shoulder as the longitudinal welding member. According to one embodiment, the longitudinal welding member and the counterstay are mutually connected such that they are movable relative to each other.

Further embodiments of the device provide that the counterstay extends past the tube-forming element (prism part or filling pipe) to the site of the longitudinal seam formation, and/or that the counterstay at least partially embraces the tube-forming element.

In a refinement of the invention, it is provided that the contact surface of the longitudinal welding member, at least at the site of the longitudinal seam formation, runs tangentially to the tube-forming element (prism part or filling pipe). If a counterstay is provided, then this can advantageously be designed such that its contact surface likewise runs parallel to the contact surface of the longitudinal welding member.

It can further be provided here that the contact surface of the longitudinal welding member and the contact surface of the counterstay, at mutually radially opposite positions, can be brought into contact with the tube-forming element.

In the device can be disposed a hereinafter described forming shoulder, with which the production of tubular bags with laterally offset longitudinal seam is possible in high quality.

For the graphic description of the invention, various terms are used hereinafter, the meaning of which is firstly explained.

"Quadrants of the cross section of the prism part" are sectors of this cross section in the top view of the prism part. The origin of a global coordinate system is here mentally transported into the middle of the cross section of the prism part, and thus into the middle of the generated tube cross section. The y-axis of the coordinate system lies parallel to the inlet direction of the packaging material web into the forming shoulder, hence the x-axis of the coordinate system runs transversely thereto and the z-axis runs parallel to the outlet direction of the packaging material web. In symmetrical forming shoulders, the seam formation accordingly takes place on the y-axis between the third and fourth quadrant.

In the production, considered here, of tubular bags with laterally offset longitudinal seam, this takes place, on the other hand, in the third quadrant (in the case of a longitudinal seam arranged to the left of the middle) or in the fourth quadrant (in the case of a longitudinal seam arranged to the right of the middle), in some circumstances within these quadrants also very close to the x-axis, i.e. close to the adjacent first or second quadrant. For simplification of the description—contrary to the otherwise usual counterclockwise definition of the quadrant counting—that quadrant in which the seam is formed is hereinafter always referred to as the fourth quadrant, so that the quadrants, in the case of a longitudinal seam arranged to the left of the middle, are counted counterclockwise.

Further parameters which are used hereinafter to characterize the forming shoulders are "folding angles", "forming edge angles", "web lines" and "shoulder lines".

A shoulder line, which is also referred to as a curve-free spatial straight line, is a straight line in space which lies on the shoulder surface. This means that it is straight not only in the top view of the shoulder surface, but also in the sectional view through the shoulder part or from any other chosen viewing direction. In the forming shoulders of the type which is described here, shoulder lines run outward from all points on the forming edge. The directions of the shoulder straight lines can be used to characterize the described forming shoulder, as is set out in greater detail further below.

A web line, on the other hand, is a straight line which is imagined running in the longitudinal direction of the nondeformed packaging material web and which runs parallel to the web edge. Thus the two web edges are themselves the outermost web lines. The course of the web lines on the shoulder surface can also be used to characterize the described forming shoulder, as is set out in greater detail further below.

The folding angle is the angle which is measured between that portion of a web line which is still located on the shoulder surface and that portion of the same web line which is already located in the prism part, at that point on the forming edge at which one portion merges into the other.

The forming edge angle is, on the other hand, the angle which is measured at a point on the forming edge between the shoulder surface and the prism part in a perpendicular sectional plane, i.e. in a plane which is spanned by the z-axis of the above-described global coordinate system and a straight line running, at the considered point, at right angles to the forming edge.

The folding angle is hence equal to the forming edge angle if, at the considered point, that portion of a web line which lies on the shoulder line meets the forming edge perpendicularly, i.e. at right angles. If this is not the case, then the folding angle is greater than the forming edge angle.

In a forming shoulder for forming a packaging material web into a tubular bag having a laterally offset longitudinal seam, which forming shoulder comprises a shoulder part and a prism part mutually connected along a forming edge, wherein that half of the forming edge which faces the incoming packaging material web lies in the first and second quadrant of the cross section of the prism part and the seam formation is realized in the fourth quadrant, it is proposed that the curvature of the shoulder surface, viewed along the web lines of the packaging material web running over the shoulder surface, in the second and fourth quadrant becomes all the stronger the closer the web line lies to the margin of the packaging material web.

Alternatively, the forming shoulder can also be described as follows: The forming edge angle measured between the surfaces of the shoulder part and the prism part decreases from the second to the third quadrant and increases again from the third to the fourth quadrant. In other words, regions of the packaging material web which have not yet entered the prism part run on the surface of the shoulder part in the second and fourth quadrant at a relatively steep angle to the prism part, in the third quadrant, on the other hand, at a relatively shallow angle.

Expressed differently, the packaging material web, in the third quadrant, is guided as tightly as possible around the prism part and, in the fourth quadrant, is spread out from the prism part, so as then to be guided in the region of the seam formation steeply back onto the prism part.

The forming shoulder can also be described, however, by the following wording: Curve-free spatial straight lines in the second and fourth quadrant, which radiate from the forming edge, converge with increasing remoteness from the prism part. From this it directly follows that curve-free spatial straight lines in the third quadrant, which radiate from the forming edge, diverge with increasing remoteness from the prism part.

In a first embodiment, it can be provided that that portion of the forming edge which lies in the first quadrant runs in a straight line transversely to the inlet direction of the packaging material web and thereby does not reach into the fourth quadrant. In an alternative, second embodiment, it can be provided, on the other hand, that that portion of the forming edge which runs from the third into the fourth quadrant runs at a steeper angle than that portion of the forming edge which runs from the first into the fourth quadrant.

In the described cases, one half of the packaging material web runs either over a forming edge running transversely to the running direction of the web, and the forming of this half of the packaging material web into the web cross section which is to be generated is realized automatically by the tension in the web, or via a forming edge portion which reaches from the first into the fourth quadrant and at the same time has a lesser slope than the opposite forming edge portion which guides the other half of the packaging material web from the second, via the third and into the fourth quadrant of the forming edge to the site of the seam formation.

It can further be provided that that portion of the forming edge which lies in the first quadrant or runs from the first into the fourth quadrant ends before the site of the seam formation. The packaging material web runs in the region between the end of the forming edge and the site of the seam formation without physical support by component parts of the forming shoulder. In order to enable this, the forming shoulder must be designed such that all web lines in the forming region are equally long.

In a further embodiment, it is provided that beneath the shoulder surface in the fourth quadrant is arranged a first guide element for supporting the formation of a longitudinal seam. Viewed in the longitudinal direction of the prism part, the first forming element can here, for instance, have a wedge shape or be lamellar. The two margins of the packaging material web project at the edge of the first guide element out of the shaped cross section and lie one upon another, so that they can be welded together into a longitudinal seam. The first guide element can here also serve as a counterface for a welding member, or the welding member is arranged beneath the forming shoulder.

The first guide element can be a fixed component part of the forming shoulder or can be detachably fastened thereto.

It can further be provided that that surface of the first guide element which faces the shaped tube cross section partially reproduces the tube cross section. By this should be understood that the inner contour of the first guide element corresponds, in that region of the prism part which is covered by the first guide element, to the contour of the tube cross section to be generated. In other words, in this embodiment the first guide element forms a part of the tube-forming element of the forming shoulder.

In a further embodiment, it is provided that at the end of the prism part is arranged a second guide element for supporting the formation of a longitudinal seam, which second guide element, at least in some regions, reproduces the outer contour of the shaped tube cross section. The guide element in question is an element which is placed beneath the web outlet from the forming shoulder and which serves to position the packaging material web, in particular in the setting-up of the machine, such that a proper passage through the forming shoulder is obtained and the web edges lie one above the other such that they can be sealed to form a longitudinal seam.

It can here be provided, for instance, that the second guide element is movable between a working position, in which the second guide element, at least in some regions, embraces the shaped tube cross section, and a set-up position, in which the second guide element is arranged remote from the shaped tube cross section. In order to set the machine up, the start of the packaging material web is initially fed by hand into the forming shoulder and is drawn far enough out of the web outlet end of the prism part that the shaping of the tube cross section can begin. The second guide element is here in the set-up position. If the start of the packaging material web is positioned at the web outlet end of the forming shoulder such that it can be grasped by a welding member and/or a pull-off device, the second guide element is moved into the working position. The exact guidance of the packaging material web between the web outlet end of the prism part and subsequent devices, for instance a pull-off device, is thereby facilitated, so that the formation of a longitudinal seam is also supported.

Finally, it can be provided that the shoulder part touches the prism part in at least one region beneath the forming edge. Contrary to the principle, familiar in connection with known forming shoulders, that the shoulder part and the prism part are mutually connected right along a common forming edge and/or merge one into the other, in this embodiment there is at least one portion in which the actual forming edge is formed by the prism part alone. In this portion beneath the forming edge, the shoulder part meets the prism part. In the above-described forming shoulder, this relates, in particular, to the transition region from the second to the third quadrant and, insofar as a physical forming edge is provided at all in this region, to the transition region from the first to the fourth quadrant. In other words, this embodiment can advantageously be applied, in particular, in those regions in which the packaging material web is guided tightly, i.e. with a small forming edge angle, around the prism part. Two things are simultaneously achieved hereby: Firstly, the packaging material web is guided in the forming region such that all web lines are equally long, which is a prerequisite for crease-free forming. Secondly, the tension in the packaging material web is so strongly increased that it transforms into the desired tube cross section precisely in the manner intended.

BRIEF DESCRIPTION OF DRAWING FIGURES

The invention is explained in greater detail below on the basis of illustrative embodiments and associated drawing figures, wherein.

DETAILED DESCRIPTION

Figure 6:
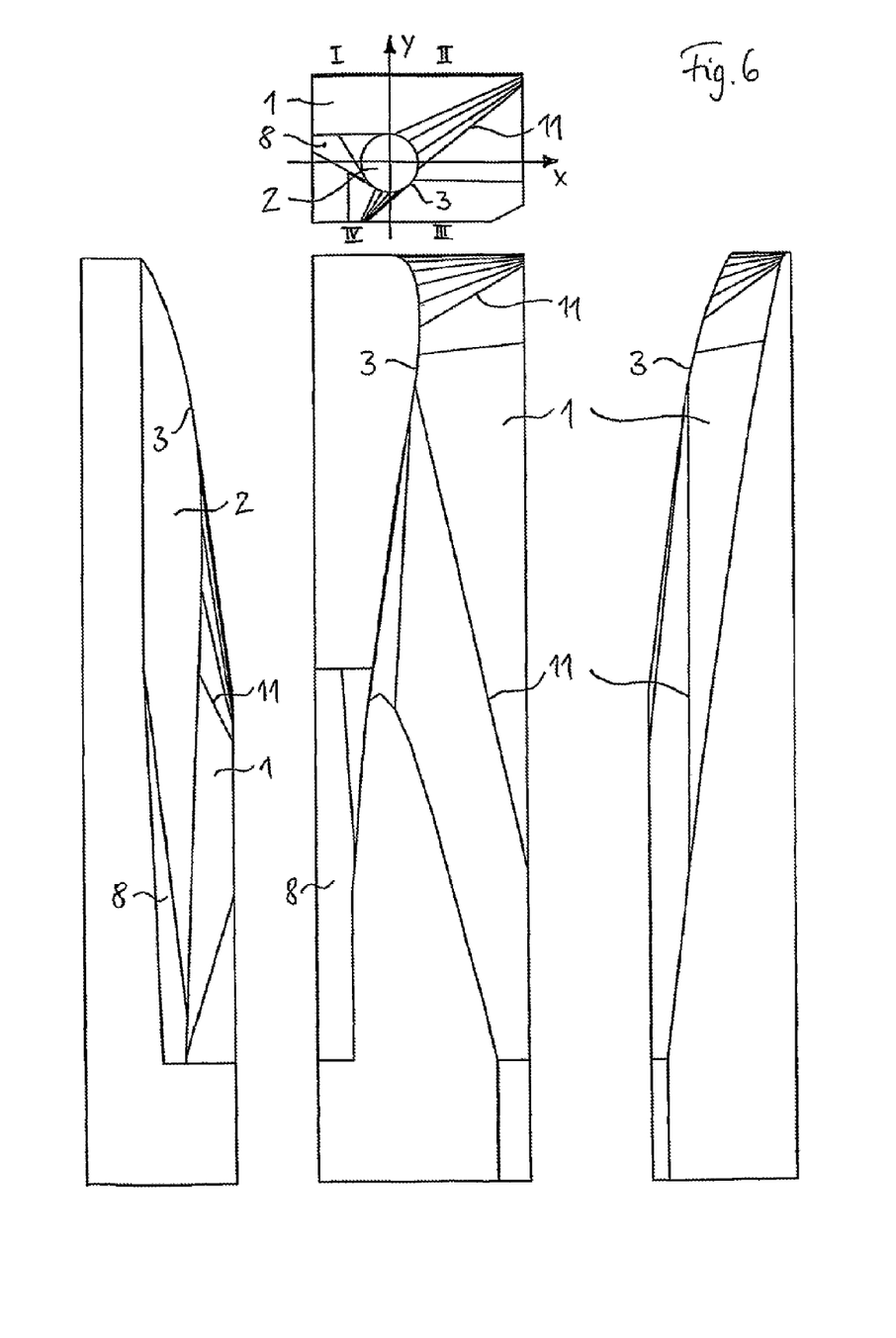
FIG. 6 shows a forming shoulder for forming a packaging material web into a tubular bag having a laterally offset longitudinal seam, in several views.

The forming shoulder represented in FIG. 6 comprises a shoulder part 1 and a prism part 2. In the top view of the forming shoulder, a global coordinate system is represented. The y-axis lies in the inlet direction of the packaging material web, while the x-axis is oriented transversely thereto. According to the above-reached agreement, in this forming shoulder the quadrant counting is realized clockwise.

The seam formation of the formed tube is realized in the 4th quadrant of the tube cross section, i.e. the quadrant of the prism part 2.

That portion of the forming edge 3 which lies in the first quadrant runs in a straight line transversely to the inlet direction of the packaging material web 4 and does not thereby reach into the fourth quadrant. That portion of the forming edge 3 which lies in the first quadrant thus ends before the site of the seam formation. The packaging material web 4 runs in the region between the end of the forming edge 3 and the site of the seam formation, without physical support by component parts of the forming shoulder, solely by virtue of the tension generated in the packaging material web 4 through the design of the forming shoulder.

On the surface of the shoulder part 1, shoulder lines 11 are illustrated. These shoulder lines 11 are curve-free spatial straight lines, i.e. straight lines in space. As can be seen in the representation, in the illustrative embodiment these straight lines, starting from the forming edge 3, increasingly converge in the second and fourth quadrant the more remote they become from the forming edge 3. By contrast, shoulder lines 11 which start from points on the forming edge 3 in the third quadrant diverge with increasing remoteness from the forming edge 3. Through the narrowing of the shoulder lines 11 with increasing distance from the forming edge 3 in the second and fourth quadrant, the curvature of the shoulder surface 1 there becomes stronger as the distance from the forming edge 3 increases.

In the fourth quadrant, a first guide element 8, of wedge-shaped configuration in top view, for supporting the formation of a longitudinal seam 42, is arranged beneath the shoulder surface 1. The first guide element receives, in the region of the first and fourth quadrant, the packaging material web 4 which has been freely shaped after the forming edge 3 and supports the forming thereof into the desired tube cross section. At the same time, the first guide element 8 supports the formation of the longitudinal seam 42, in that the two margins of the packaging material web 4, at the edge of the first guide element 8, project out from the shaped cross section and lie one upon the other on the outer side of the first guide element 8 in such a way that they can be welded together into a longitudinal seam 42.

Figure 7:
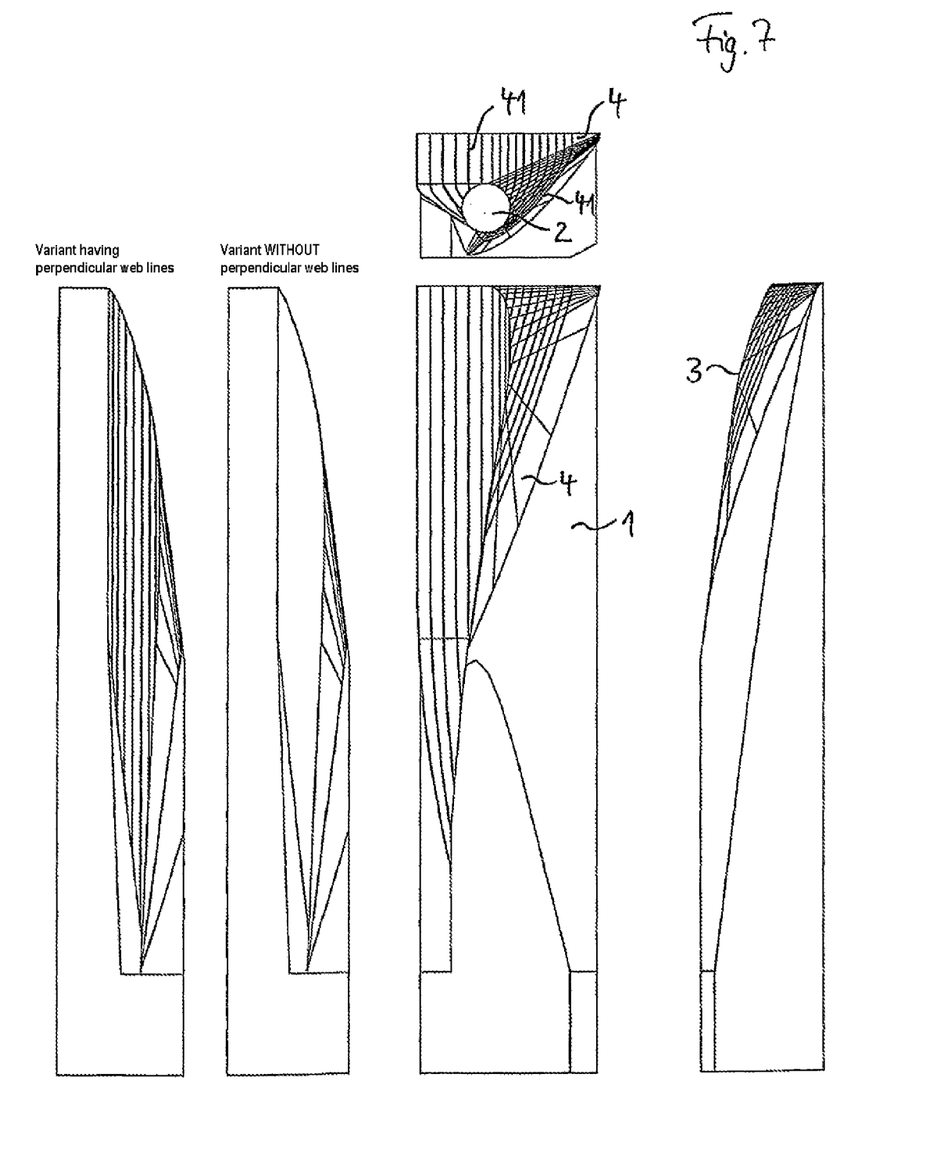
FIG. 7 shows the forming shoulder according to FIG. 6, with a packaging material web running over it, in several views.

In FIG. 7 is represented a packaging material web 4 which is guided over the forming shoulder. The web lines 41 which are imagined running on the packaging material web 4 parallel to the margin of the packaging material web 4 overlie the shoulder lines 11. In particular in the top view of the forming shoulder, it can be seen that the web lines 41 in the third quadrant are guided very tightly around the prism part 2. After this, the web lines 41, which in the fourth quadrant have not yet been diverted into the prism part 2, are guided on the surface of the shoulder part 1 once again away from the prism part 2, i.e. are spread out. The curvature of the shoulder surface 1, and thus of the packaging material web 4, viewed along the web lines 41 of the packaging material web 4 running over the shoulder surface 1, is in the second and fourth quadrant increasingly strong the closer the web line 41 lies to the margin of the packaging material web 4.

Figure 8:
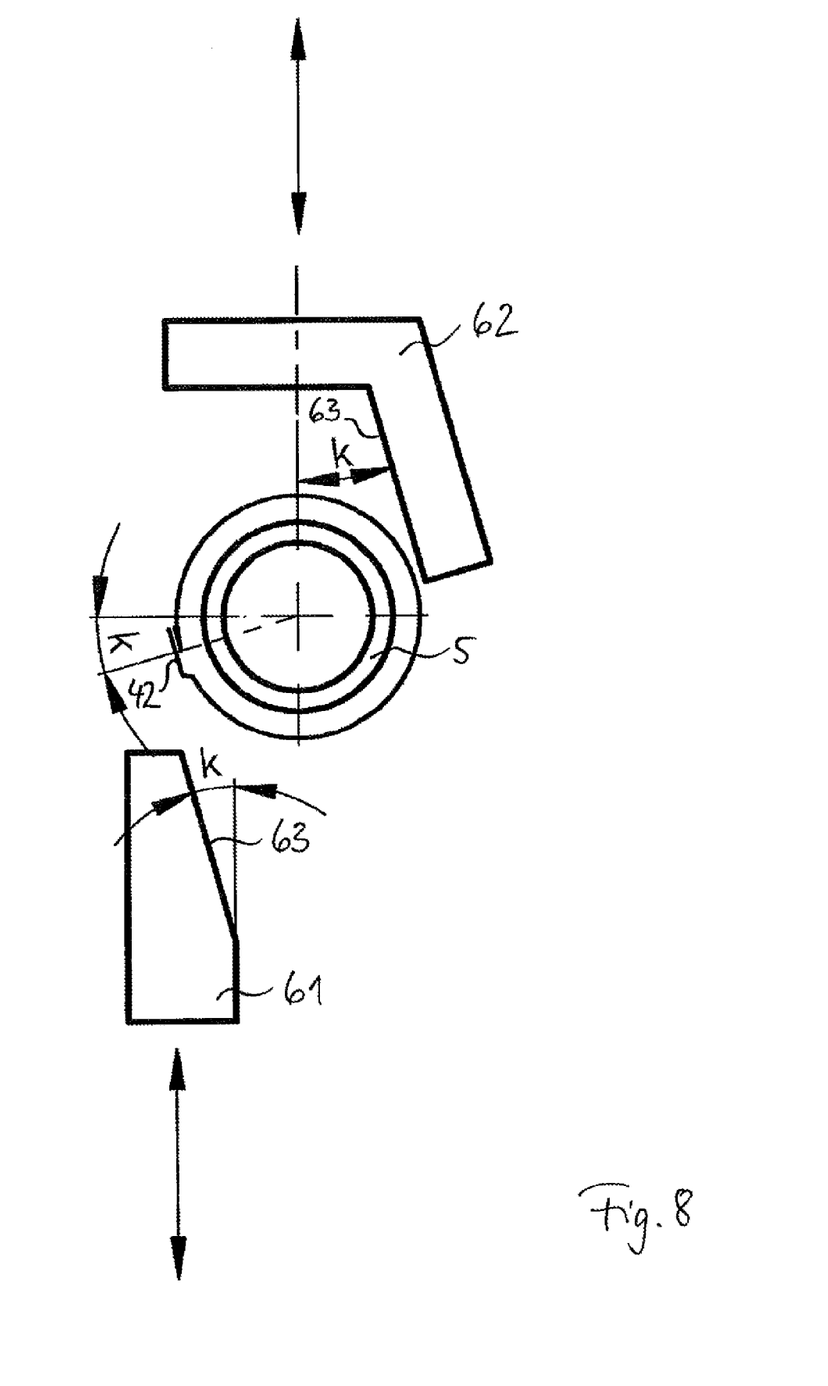
FIG. 8 shows a welding device having contact surfaces running tangentially to the tube-forming element.

FIG. 8 shows a cross section through the formed tube profile at the end of the prism part 2, as well as the filling pipe 5 which is arranged therein. The longitudinal welding device 6 for producing the longitudinal seam 42 comprises a longitudinal welding member 61 and a counterstay 62. The longitudinal welding member 61 and the counterstay 62 have, in the region of the seam formation 42, a tangentially running contact surface 63. For this purpose the angle k, with which the contact surfaces 63 are skewed in relation to the y-axis of the global coordinate system, is equal to the angle k by which the site of the seam formation 42 is skewed in relation to the x-axis.

Figure 9:
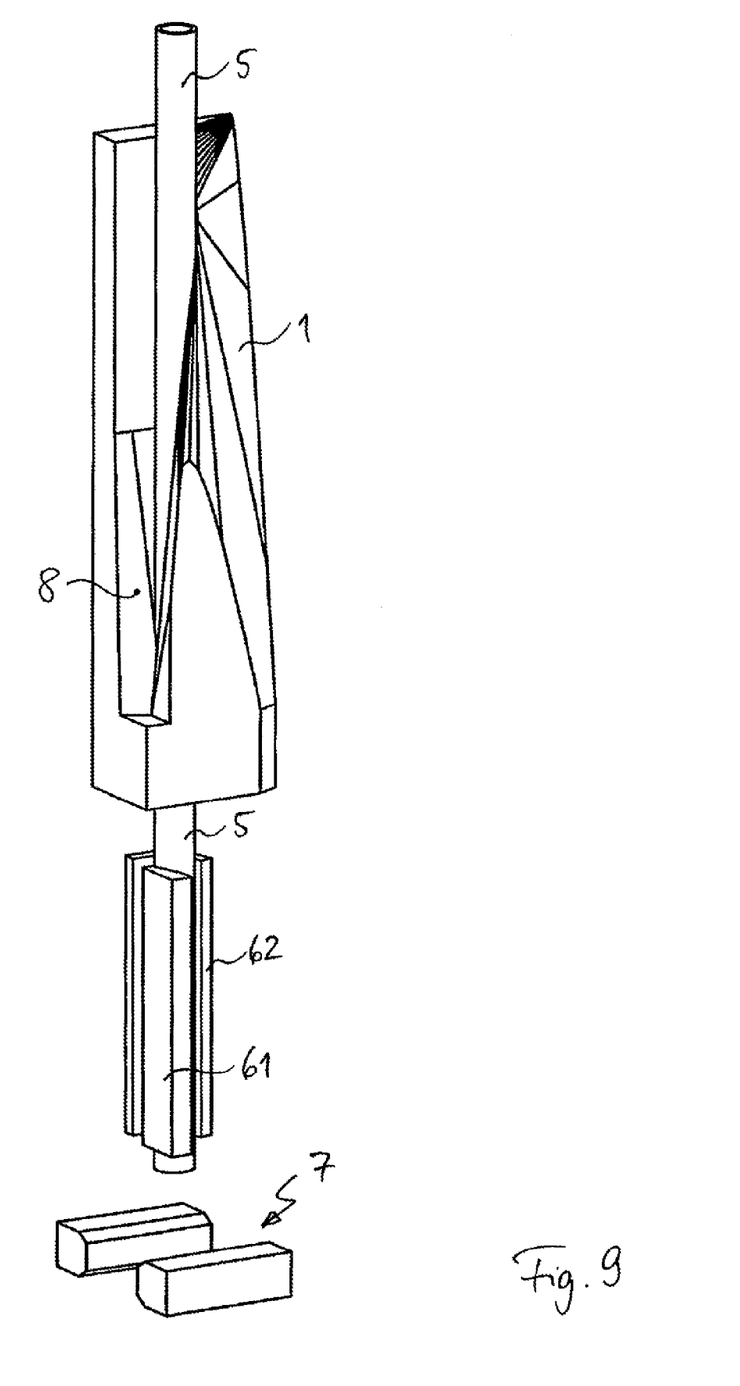
FIG. 9 shows the forming shoulder according to FIGS. 6 and 7, with a welding device according to FIG. 8, in perspective view.

The representation of FIG. 9 shows the forming shoulder jointly with the longitudinal welding device 6 and a transverse welding device 7 by which the tube is transversely sealed and, where necessary, perforated and separated. It can further be seen that the longitudinal welding member 61 and the counterstay 62 act against the lower end of the filling pipe 5. The counterstay 62 here serves to support the force applied by the longitudinal welding member 61 to the filling pipe 5.

Figure 10:
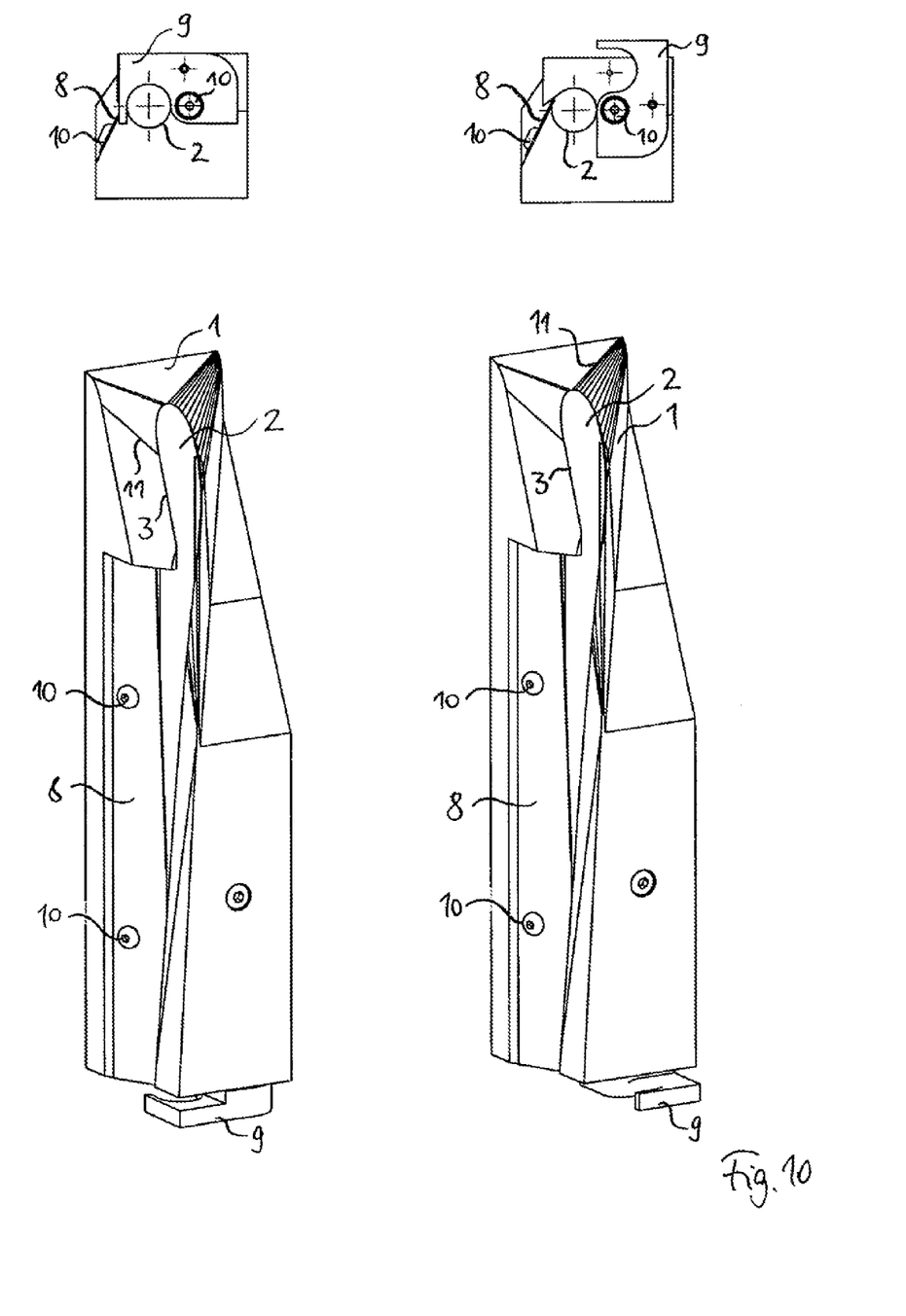
FIG. 10 shows a forming shoulder for forming a packaging material web into a tubular bag having a laterally offset longitudinal seam, with a first and second guide element.

FIG. 10 shows a further forming shoulder. In this forming shoulder, the forming edge 3 reaches from the first into the fourth quadrant, wherein that portion of the forming edge 3 which runs from the third into the fourth quadrant runs at a steeper angle than that portion of the forming edge 3 which runs from the first into the fourth quadrant.

At the same time, that portion of the forming edge 3 which runs from the first into the fourth quadrant ends before the site of the seam formation. The packaging material web 4 runs in the region between the end of the forming edge 3 and the site of the seam formation, without physical support by component parts of the forming shoulder, solely by virtue of the tension generated in the packaging material web 4 through the design of the forming shoulder.

In the fourth quadrant, a first guide element 8, which is of lamellar configuration and is detachably connected to the forming shoulder by screws 10, is arranged beneath the shoulder surface 1 in order to support the formation of a longitudinal seam 42. The first guide element receives, in the region of the first and fourth quadrant, the packaging material web 4 which has been freely shaped after the forming edge 3 and supports the forming thereof into the desired tube cross section. At the same time, the first guide element 8 supports the formation of the longitudinal seam 42, in that the two margins of the packaging material web 4, at the edge of the first guide element 8, project out from the shaped cross section and lie one upon the other on the outer side of the first guide element 8 in such a way that they can be welded together into a longitudinal seam 42.

At the end of the prism part 2 is arranged a second guide element 9 for supporting the formation of a longitudinal seam, which second guide element, in some regions, reproduces the outer contour of the shaped tube cross section. The guide element in question is an element which is placed beneath the web outlet from the forming shoulder and which serves to position the packaging material web 4, in particular in the setting-up of the machine, such that a proper passage through the forming shoulder is obtained and the web edges lie one above the other such that they can be sealed to form a longitudinal seam 42.

The second guide element 9 is movable between a working position (left-hand illustration), in which the second guide element 9, at least in some regions, embraces the shaped tube cross section, and a set-up position (right-hand illustration), in which the second guide element 9 is arranged remote from the shaped tube cross section. In the illustrative embodiment, the guide element in question is a lamellar element having a contour which is matched to the tube cross section and in the working position bears against the tube cross section, therefore in the illustrative embodiment is arc-shaped, and which is pivotably attached to the bottom side of the forming shoulder by means of a screw 10.

The invention claimed is:

1. A forming shoulder for forming a packaging material web into a tubular bag having a laterally offset longitudinal seam, comprising a shoulder part and a prism part mutually connected along a forming edge, wherein a half of the forming edge which faces an incoming packaging material web lies in a first and a second quadrant of a cross section of the prism part, the laterally offset longitudinal seam is formed in a fourth quadrant, curve-free spatial straight lines in the second quadrant and the fourth quadrant, which radiate from the forming edge, converge with increasing remoteness from the prism part, and a forming edge angle measured between surfaces of the shoulder part and an inner side of the prism part decreases from the second to a third quadrant and increases again from the third to the fourth quadrant, whereby the longitudinal seam is generated eccentrically in relation to a cross section of the tubular bag.

2. The forming shoulder as claimed in claim 1, wherein a portion of the forming edge which lies in the first quadrant runs in a straight line transversely to an inlet direction of the packaging material web, and thereby does not reach into the fourth quadrant.

3. The forming shoulder as claimed in claim 1, wherein a portion of the forming edge which runs from the third into the fourth quadrant runs at a steeper angle than a portion of the forming edge which runs from the first into the fourth quadrant.

4. The forming shoulder as claimed in claim 1, wherein a portion of the forming edge which lies in the first quadrant or runs from the first into the fourth quadrant ends before site of the seam formation.

5. The forming shoulder as claimed in claim 4, wherein beneath the shoulder surface in the fourth quadrant is arranged a first guide element supporting the formation of a longitudinal seam.

6. The forming shoulder as claimed in claim 5, wherein a surface of the first guide element faces a shaped tube cross section and partially reproduces the tube cross section.

7. The forming shoulder as claimed in claim 6, wherein at an end of the prism part is arranged a second guide element supporting the formation of the longitudinal seam, and the second guide element, at least in some regions, reproduces an outer contour of the shaped tube cross section.

8. The forming shoulder as claimed in claim 7, wherein the second guide element is movable between a working position, in which the second guide element, at least in some regions, embraces the shaped tube cross section, and a set-up position, in which the second guide element is arranged remote from the shaped tube cross section.

9. The forming shoulder as claimed in claim 8, wherein the shoulder part touches the prism part in at least one region beneath the forming edge.

* * * * *